(12) United States Patent
McRae et al.

(10) Patent No.: US 11,011,978 B2
(45) Date of Patent: *May 18, 2021

(54) HIGH EFFICIENCY HYBRID POWER CONVERTER APPARATUS

(71) Applicant: TEXAS INSTRUMENTS INCORPORATED, Dallas, TX (US)

(72) Inventors: Timothy McRae, Toronto (CA); Aleksandar Prodic, Toronto (CA); Sombuddha Chakraborty, Redwood City, CA (US); Alvaro Aguilar, Irving, TX (US); William James McIntyre, Wheatland, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/827,393

(22) Filed: Mar. 23, 2020

(65) Prior Publication Data

US 2020/0227997 A1  Jul. 16, 2020

Related U.S. Application Data

(63) Continuation of application No. 15/858,931, filed on Dec. 29, 2017, now Pat. No. 10,601,304.

(60) Provisional application No. 62/557,399, filed on Sep. 12, 2017.

(51) Int. Cl.
*H02M 3/07* (2006.01)
*H02M 3/158* (2006.01)
*H02M 1/00* (2006.01)

(52) U.S. Cl.
CPC .............. *H02M 3/07* (2013.01); *H02M 3/073* (2013.01); *H02M 3/158* (2013.01); *H02M 2001/0009* (2013.01); *H02M 2001/0077* (2013.01); *H02M 2001/0093* (2013.01)

(58) Field of Classification Search
CPC ......... H02M 3/156–1588; H02M 3/07; H02M 3/073; H02M 2003/071; H02M 2003/072; H02M 2003/075–078
See application file for complete search history.

(56) References Cited

U.S. PATENT DOCUMENTS 9,748,852 B2    8/2017  Freeman
2009/0278520 A1  11/2009  Perreault
(Continued)

OTHER PUBLICATIONS

McRae et al., "Hybrid Serial-Output Converter Topology for Volume and Weight Restricted LED lighting Applications", Laboratory for Power Management and Integrated SMPS ECE Department, 2015, 6 pages (Year: 2015).*

(Continued)

*Primary Examiner* — Thienvu V Tran
*Assistant Examiner* — Sisay G Tiku
(74) *Attorney, Agent, or Firm* — Michael A. Davis., Jr.; Charles A. Brill; Frank D. Cimino

(57) ABSTRACT

An apparatus includes: a switched capacitor (SC) converter to generate a first voltage based on a voltage source; and a direct current-to-direct current (DC-DC) converter to generate a second voltage based on the voltage source of the apparatus. A difference between the first voltage and the second voltage corresponds to an output voltage.

7 Claims, 9 Drawing Sheets

(56) References Cited

U.S. PATENT DOCUMENTS

| | | | |
|---|---|---|---|
| 2009/0322304 A1* | 12/2009 | Oraw | H02J 1/102 |
| | | | 323/312 |
| 2013/0106382 A1 | 5/2013 | Marsili | |
| 2014/0169588 A1* | 6/2014 | Petersen | H03F 3/68 |
| | | | 381/120 |
| 2016/0352218 A1 | 12/2016 | Stauth | |
| 2018/0123453 A1 | 5/2018 | Pugglli | |

OTHER PUBLICATIONS

Chen et al., "A SIMO Parallel-String Driver IC for Dimmable LED Backlighting With Local Bus Voltage Optimization and Single Time-Shared Regulation Loop", IEEE Transactions on Power Electronics, vol. 27, No. 1, Jan. 2012, 11 pages.

Shousha et al., "Assisting Converter Based Integrated Battery Management System for Low Power Applications", Laboratory of Power Management and Integrated SMPS, ECE Department, IEEE, 2014, 5 pages.

Yeates et al., "Quasi-Parallel Switched-Capacitor and Regulating PWM DC-DC Converter", IEEE, 2014, 7 pages.

McRae et al., "Hybrid Serial-Output Converter Topology for Volume and Weight Restricted LED lighting Applications", Laboratory for Power Management and Integrated SMPS ECE Department, 2015, 6 pages.

McRae et al., "Hybrid Serial-Output Converter for Integrated LED Lighting Applications", 2016, 6 pages.

* cited by examiner

HIGH EFFICIENCY HYBRID POWER CONVERTER APPARATUS

CROSS-REFERENCE TO RELATED APPLICATIONS

This application is a continuation of U.S. patent application Ser. No. 15/858,931 filed Dec. 29, 2017, which claims priority to U.S. Provisional Patent Application No. 62/557,399 filed Sep. 12, 2017, the entireties of which are incorporated herein by reference.

BACKGROUND

This relates generally to power converters, and more particularly to a high efficiency hybrid power converter and methods to control the same.

The principles of low-power energy conversion have been rooted in direct current (DC) to DC (DC-DC) power converters (such as buck converters, boost converters, buck-boost converters, switched capacitor converters, etc.). A buck converter uses non-linear circuits created by connecting passive components (such as inductors, capacitors, etc.) to switching devices (such as transistors, diodes, etc.). The buck converter can control such switching devices to reorganize the connections between an input source and an output load to adjust the input source (e.g., a voltage) to a desired output voltage, lower than the source voltage. Similarly, a boost converter converts a source voltage to a desired output voltage higher than the source voltage. A buck-boost converter can convert a source voltage to a desired output voltage higher or lower than the source voltage (e.g., depending on control of the switches). A switched capacitor converter is a voltage regulator that does not require an inductor. A switched capacitor converter uses capacitive energy storage and switching algorithms to deliver high efficiency voltage conversion from a source voltage to a desired output voltage.

SUMMARY

An apparatus includes a switched capacitor (SC) converter to generate a first voltage based on a voltage source; and a direct current-to-direct current (DC-DC) converter to generate a second voltage based on the voltage source, a difference between the first voltage and the second voltage corresponding to an output voltage of the apparatus.

In described examples of apparatus providing a high efficiency hybrid power converter, the apparatus includes a controller to control a first group of switches of an SC converter and a second group of switches of a DC-DC converter according to a first switching protocol to discharge a first current to the DC-DC converter via a first output at a first time; and a current matcher to integrate the first current to determine a first charge; compare the first charge to a reference charge, the reference charge corresponding to a desired output current; and instruct the controller to adjust control of the second group of switches of the DC-DC converter based on the comparison for a first output during a subsequent cycle.

In described examples of method of controlling a high efficiency hybrid power converter, the method includes controlling, by executing an instruction using a processor, a first group of switches of an SC converter and a second group of switches of a DC-DC converter according to a first switching protocol to discharge a first current to the DC-DC converter via a first output at a first time; integrating, by executing an instruction using the processor, the first current to determine a first charge; comparing, by executing an instruction using the processor, the first charge to a reference charge, the reference charge corresponding to a desired output current; and adjusting, by executing an instruction using the processor, control of the second group of switches of the DC-DC converter based on the comparison for a first output during a subsequent cycle.

DETAILED DESCRIPTION OF EXAMPLE EMBODIMENTS

Figure 1:
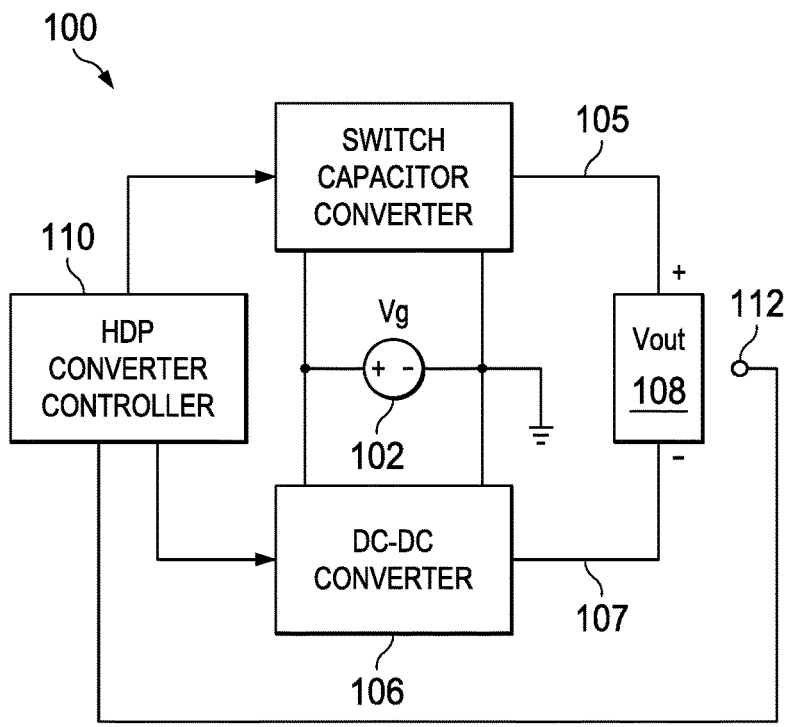
FIG. 1 is a schematic illustration of hybrid divided power (HDP) converter.

The drawings are not necessarily drawn to scale. In the drawings, like parts are referenced by like reference numbers.

DC-DC converters are power converters that convert an input voltage into a desired output voltage higher or lower than the input voltage. To generate the desired output voltage, DC-DC converters toggle switches based on a switching protocol to control voltage/current within the converter to charge and discharge an inductor and/or capacitor of the converter to generate a desired output voltage. The switching protocol (e.g., corresponding to (A) which switches are toggled (B) the frequency of the switching (C) the pattern of the switching) corresponds to an output voltage. Accordingly, the output voltage can be adjusted with high granularity by adjusting aspects of the switching protocol.

Switched capacitor (SC) converters are power converters that convert an input voltage to a desired output voltage higher than the input voltage. To generate the desired output voltage, the SC converter is structured to include a combination of switches and capacitors to store charge that generates the desired output voltage. SC converters are highly efficient power converters with high energy density. However, because the output voltage depends on the fixed structure of the SC capacitor, SC converters have limited or no adjustability (e.g., without reduction in converter efficiency). For example, some SC converters can only output one output voltage (e.g., one scaled version of the input), while others may be able to output a couple (e.g., 2-4) output voltages based on the input. However, even SC converters that are capable of outputting 2-4 different voltages cannot be adjusted with high precision. For example, an SC converter may be only able to output 1 times an input voltage, 2 times an input voltage, or 3 times an input voltage. Accordingly, although SC converters may have a higher efficiency and energy density than DC-DC converters, SC converters have much lower controllability than DC-DC converters.

Examples disclosed herein include an HDP converter (e.g., a step-up converter) including a combination of an SC converter and a DC-DC converter. Such a combination leverages the high efficiency and energy density of an SC converter with the high adjustability of a DC-DC converter by dividing the power processing between the two converters. For example, an HDP converter can (A) operate the SC converter according to a first switching protocol to generate an SC output voltage and (B) operate the DC-DC converter according to a second switching protocol to generate a DC-DC output voltage, where the output voltage of the HDP converter is the difference between the SC output voltage and the DC-DC output voltage. In such an example, the desired output voltage (e.g., the HDP converter output voltage) can be measured to ensure that the HDP output voltage matches the desired converter output voltage. If the actual output voltage does not match the desired voltage, examples disclosed herein adjust the second switching protocol of the DC-DC converter to more closely match the desired output voltage. Accordingly, examples disclosed herein provide an HDP that is highly efficient and highly adjustable (e.g., the output voltage can be adjusted with high granularity or precision). Such an increase in efficiency allows the reduction of total converter volume without increasing heat density. The converter volume can be reduced compared to conventional converters for the same application due to the lower inductance requirement and lower blocking voltage of the switching elements of examples disclosed herein. Using examples disclosed herein, a passive volume of a power converter may be reduced by up to 70% while efficiency may be improved by up to 20%. Accordingly, examples disclosed herein achieve smaller and more efficient highly controllable or adjustable power converters.

Because power converters may drive LEDs/LED strings (e.g., for LED backlighting for LED-based screens), some examples disclosed herein are described in conjunction with LED strings. In some examples, a current source is desired to drive LED strings because the brightness of an LED is proportional to the current through it. However, due to variations in manufacturing, some LEDS do not have the same voltage drop and draw different amounts of current for the same voltage. Conventional techniques of matching current between LED strings include the use of analog current regulators. However, such current regulators decrease efficiency and increase silicon area of the converter. Accordingly, examples disclosed herein include a current balancing technique based on charge matching to ensure that output current is balanced between different outputs (e.g., LED strings) of a multiple-output HDP converter without the need for auxiliary components for tight current matching, corresponding to a more efficient and cheaper LED backlight driver.

FIG. 1 is a schematic illustration of hybrid divided power (HDP) converter 100. FIG. 1 shows an example voltage supply (Vg) 102, an example switched capacitor (SC) converter 104, an example DC-DC converter 106, an example output voltage 108, an example HDP converter controller 110, and an example voltage sensor 112.

The SC converter 104 converts the voltage source 102 into a higher voltage (e.g., the SC converter output voltage at an SC output node 105) based on a switch control algorithm designed to strategically store charge in capacitors of the SC converter 104. The HDP converter controller 110 controls the switches to store the charge such that the SC output voltage at the SC output node 105 corresponds to a desired output voltage (e.g., for the example output voltage 108). In some examples, the SC converter 104 is a Fibonacci converter where the output voltage at the SC output node 105 corresponds to a gain equal to Fibonacci numbers. For example, the HDP converter controller 110 can control the SC switches (e.g., by toggling between different groups of switches) to cause the flying capacitor voltages to correspond to the voltage source 102 scaled by 1, 2, 3, or 5 (e.g., the voltage at the SC output node 105 may be 18.5 Volts (V) when the voltage source is 3.7 V). Alternatively, other types of SC converters may be used. As described herein, the SC converter 104 has high efficiency and high energy density, but has limited controllability while maintaining high power processing efficiency (e.g., the output voltage may not be adjustable or may be adjusted with low granularity or precision).

The DC-DC converter 106 is a power converter (such as a buck converter, a boost converter, a buck-boost converter, etc.) that can boost the voltage source 102 to a desired output and/or buck (e.g., reduce) the voltage source 102 to a desired output. As described herein, the DC-DC converter 106 is an inverting DC-DC converter (e.g., where the output voltage is a scaled and inverted voltage corresponding to the input voltage). Utilizing an inverting DC-DC converter provides a large output gain (e.g., the output voltage 108=SC output voltage−(−AVg), where A is the scaling factor of the DC-DC converter 106). However, the DC-DC converter 106 may be a non-inverting DC-DC converter. A non-inverting DC-DC converter provides a lower output gain than an inverting DC-DC converter in the HDP converter 100 (e.g., the difference between the voltage source 102 and the output voltage 108). Accordingly, if a small gain is desired, the DC-DC converter 106 may be replaced with a non-inverting DC-DC converter. As described herein, the DC-DC converter 106 is less energy dense than the SC converter 104, but has good controllability (e.g., the output voltage can be adjusted with high granularity by adjusting the switching frequency and/or pulse width modulation (PWM) duty ratio of the DC-DC switches). The desired DC-DC output, at a DC-DC output node 107, is based on a switch control algorithm/protocol designed to strategically charge/discharge the inductor of the DC-DC converter 106. The HDP converter controller 110 controls the switches to charge/discharge the inductor such that the DC-DC output voltage at the DC-DC output node 107 corresponds to a desired output voltage 108.

As described hereinabove, the output voltage 108 corresponds to the difference between the voltage at the SC output node 105 and the voltage at the DC-DC output node 107. In some examples, the output voltage 108 may correspond to multiple output voltages for multiple outputs, as further described hereinbelow in conjunction with FIGS. 3-5. In some examples, such a differential structure of the SC converter 104 and the DC-DC converter 106 can be leveraged to generate a multi-output HDP converter, where the SC is a single output converter and the buck-boost is a multi-output converter. Because multi-output SC converters require many additional components to operate, such a multi-output HDP converter reduces the number of components required relative to traditional multi-output SC converters.

The HDP converter controller 110 controls the switches of the SC converter 104 according to a first switching protocol and the DC-DC converter 106 according to a second switching protocol to generate desired voltage(s) at the SC node 105 and the DC-DC node 107 to generate the output voltage 108. In some examples (e.g., when the SC converter 104 includes the SC capacitor 212, such as in FIGS. 2-4), the HDP converter controller 110 operates the SC converter 104 independently of the DC-DC converter 106. In such examples, the HDP converter controller 110 selects a first protocol (e.g., switching pattern corresponding to a first group of switches, a first frequency, and/or a PWM) for operating the SC switches of the SC converter 104 to generate the desired SC output voltage and selects a second protocol, independent of the first protocol, for operating the DC-DC switches of the DC-DC converter 106 to generate the desired DC-DC output voltage. In some examples (e.g., when the SC converter 104 does not include the SC output capacitor 212, such as in FIG. 5), the HDP converter controller 110 operates the SC converter 104 in conjunction with the DC-DC converter 106 to ensure that the inductor of the DC-DC converter 106 acts a current source to drive current through that load while being discharged by the the charged capacitor(s) of the SC converter 104.

The HDP converter controller 110 determines if the output voltage 108 matches (e.g., is within a threshold range of) the desired output voltage based on a voltage measurement of the voltage sensor 112. In this manner, if the output voltage 108 is outside of a threshold range of the desired output voltage, the HDP converter controller 110 can adjust the voltage at the DC-DC node 107 by changing the switching protocol of the DC-DC switches. For example, the HDP converter controller 110 can change the switching frequency and/or PWM scheme used for switching. Because, the DC-DC converter 106 has high controllability, the HDP converter controller 110 adjusts the DC-DC control protocol to adjust the voltage at the DC-DC node 107 until the output voltage substantially matches (e.g., is within a threshold range of) the desired output voltage. In some examples, the HDP converter controller 110 performs a current matching technique based on an output current measurement to ensure that when the HDP converter 100 has multiple outputs, each output has the same current. The HDP converter controller 110 is further described hereinbelow in conjunction with FIGS. 6-7.

Figure 2:
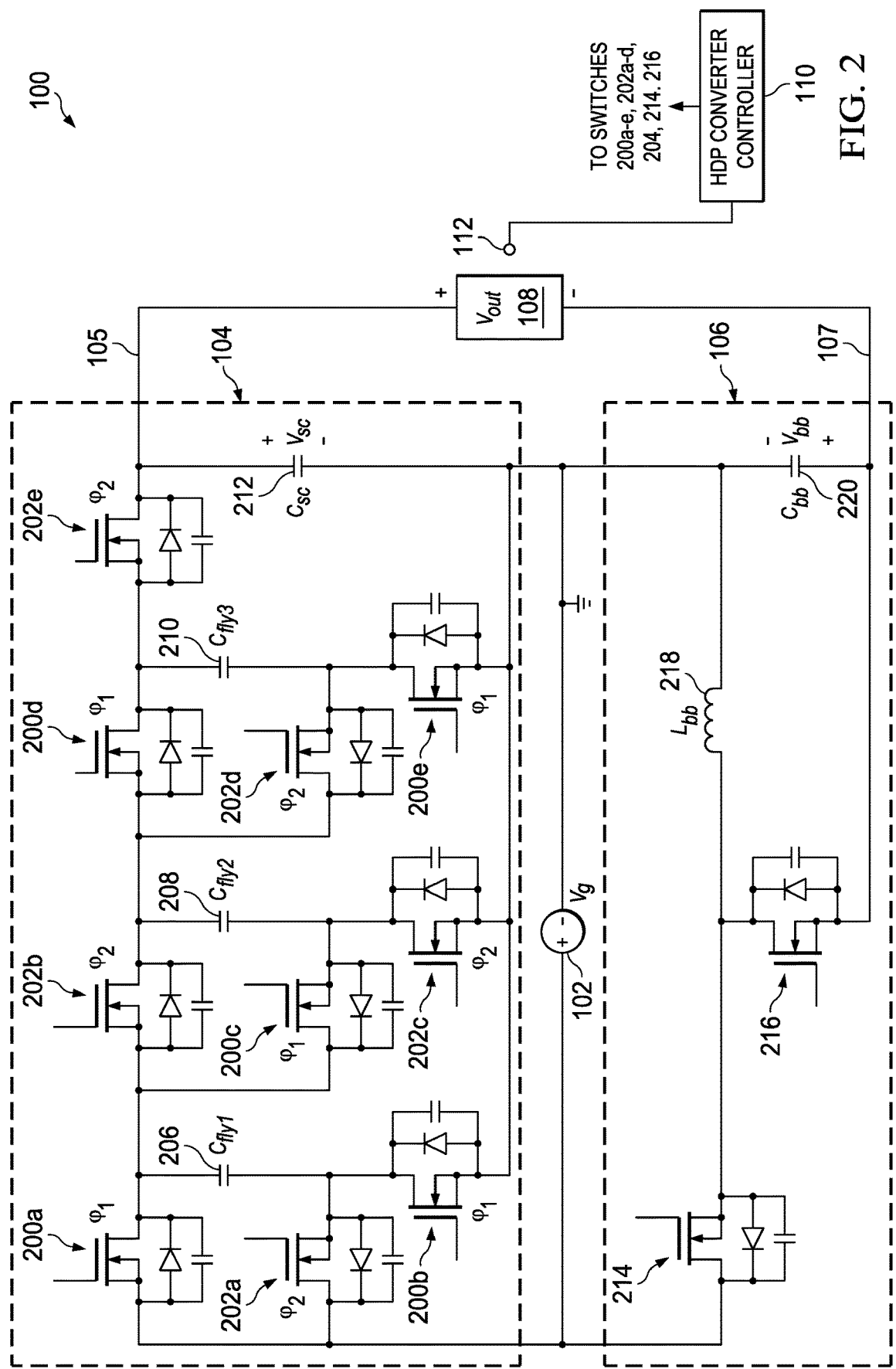
FIG. 2 is a detailed view of an example switched capacitor converter and an example DC-DC converter of a HDP converter of FIG. 1 with a single output.

FIG. 2 is an example detailed view of the SC converter 104 and the DC-DC converter 106 of the HDP converter 100 of FIG. 1 with a single output. The example HDP converter 100 of FIG. 2 includes the voltage source 102, the SC node 105, the DC-DC node 107, the output voltage 108, the HDP converter controller 110, and the voltage sensor 112 of FIG. 1. The SC converter 104 includes an example first set of switches 200a-e, an example second set of switches 202a-e, example flying capacitors 206, 208, 210, and an example SC capacitor 212. The example DC-DC converter 106 includes an example main switch 214, an example synchronous rectifier (SR) switch 216, an example inductor 218, and an example DC-DC capacitor 220. Although the DC-DC converter 106 is illustrated as an example inverting buck-boost converter, any other type of DC-DC converter may alternatively be used. Although the switches 200a-e, 202a-e, 214, 216 are represented as metal-oxide-semiconductor field-effect transistors (MOSFETs), the switches 200a-e, 202a-2, 214, 216 may be implemented by any type of switch (such as diodes, mechanical switches, etc.).

As described hereinabove, the HDP converter controller 110 controls the switches 200a-e, 202a-e to utilize the voltage source 102 to generate a desired output voltage at the SC node 105. The voltage at the SC node 105 corresponds to the voltage across the SC capacitor 212. Accordingly, the HDP converter controller 110 controls (e.g., toggles) the switches 200a-e, 202a-e to charge the flying capacitors 206, 208, 210, thereby increasing the voltage across the SC capacitor 212. In some examples, the HDP converter controller 110 controls (A) the first group of switches 200a-e as a complimentary group to (B) the second group of switches 202a-e. For example, when the HDP converter controller 110 enables the first group of switches 200a-e, the HDP converter controller 110 disables the second group of switches 202a-e, and vice versa. Accordingly, the HDP converter controller 110 toggles (e.g., at a first frequency/PWM scheme) between the two complementary groups to achieve a conversion ratio of 5 (e.g., scaling the voltage of the voltage source 102 by five at the SC capacitor 212), for example. In this manner, the voltage at the SC node 105 is five times the voltage source 102. For example, if the voltage source 102 is outputting 3.7 V, the HDP converter controller 110 toggles between the first and second complementary groups of switches to achieve 18.5 V at the SC output node 105 (e.g., the voltage across the SC capacitor 212). Alternatively, the HDP converter controller 110 may toggle between a different complementary groupings of switches for a difference conversion ratio (e.g., 1, 2, 3, and/or 4).

The HDP converter controller 110 additionally controls the main switch 214 and the SR switch 216 to charge/discharge the inductor 218 and the example DC-DC capacitor 220, according to a first switching protocol (e.g., corresponding to a first group of switches, a first frequency, a first PWM scheme, etc.) to increase or decrease the voltage output by the voltage source 102 to a desired output voltage at the DC-DC node 107. Because the DC-DC converter 106 is an inverting DC-DC converter, the voltage at the DC-DC node 107 is a scaled negative voltage, thereby providing a large voltage differential at the output voltage 108. Alternatively, the DC-DC converter 106 may be a non-inverting DC-DC converter for a smaller gain. The DC-DC converter 106 is a buck-boost converter (e.g., which may operate in continuous conduction mode or discontinuous conduction mode). Accordingly, the DC-DC converter 106 can output a voltage at the DC-DC node 107 that is higher or lower than the input voltage (e.g., the voltage output by the voltage source 102), depending on how the switches 214, 216 are controlled. The voltage at the DC-DC node 107 (e.g., the voltage across the DC-DC capacitor 220) depends on the frequency/PWM scheme of the switching. Accordingly, the HDP converter controller 110 can adjust the frequency/PWM scheme of the switching of the switches 214, 216 to adjust the voltage at the DC-DC node 107. Control of the SC converter 104 and the DC-DC converter 106 of FIG. 2 may be independent of each other. Accordingly, the HDP converter controller 110 applies a first switching protocol to the switches 200a-e, 202a-e of the SC converter 104 and a second switching protocol, independent of the first switching protocol, to the switches 214, 216 of the DC-DC converter 106.

When the HDP converter controller 110 receives instructions (e.g., preprogrammed or from another device or processor) to generate a desired output voltage, the HDP converter controller 110 determines how to control the DC-DC switches 214, 216 to generate a voltage at the DC-DC node 107 such that the difference between the voltage at the SC node 105 and the voltage at the DC-DC node 107 equals the desired output voltage. For example, if the voltage source is 3.7 V and desired output voltage is 25 V, the HDP converter controller 110 determines that the voltage at the SC node 105 will be 18.5 V (e.g., due to the SC conversion ratio of 5). In such an example, the HDP converter controller 110 selects a boost switching scheme for the switches 214, 216 corresponding to −6.5 V at the DC-DC node 107 (e.g., 18.5 V−(−6.5 V)=25 V). In such an example, the HDP converter controller 110 performs a voltage feedback routine to ensure that the actual output voltage 108 is within a threshold range (e.g., a predetermined threshold range) of the desired output voltage. For example, the HDP converter controller 110 determines the actual output voltage 108 via the voltage sensor 112. If the HDP converter controller 110 determines that the output voltage 108 is not within the threshold range of the desired voltage, the HDP converter controller 110 adjusts the frequency/PWM switching scheme of the switching protocol of the DC-DC switches 214, 216 to adjust the voltage at the DC-DC node 107, thereby adjusting the output voltage 108 to more closely match the desired output voltage.

Figure 3:
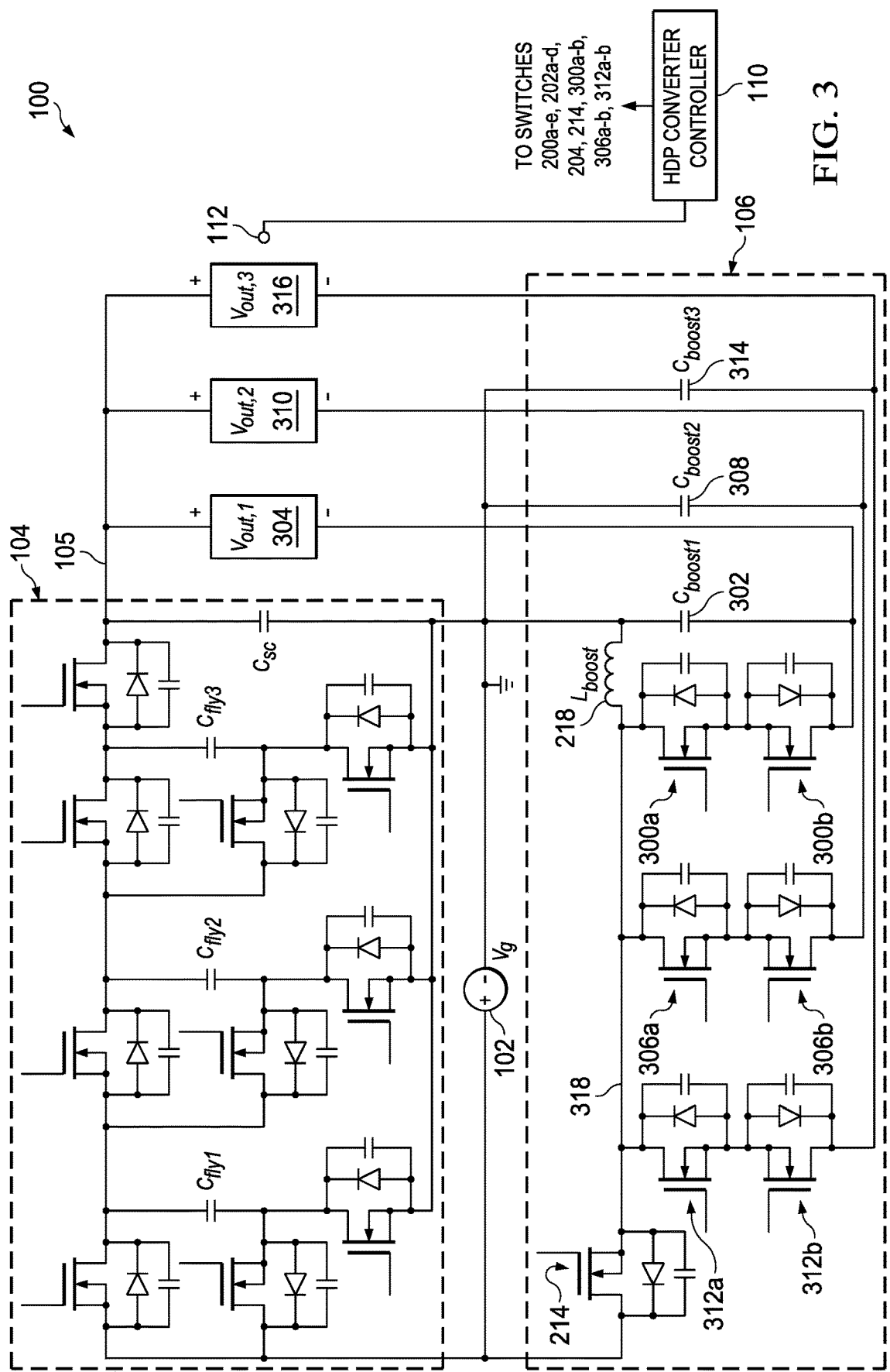
FIG. 3 is a detailed view of an example switched capacitor converter and an example DC-DC converter of a HDP converter of FIG. 1 with multiple outputs.

FIG. 3 is an example detailed view of the SC converter 104 and the DC-DC converter 106 of the HDP converter 100 of FIG. 1 with multiple outputs. FIG. 3 includes the voltage source 102, the SC converter 104, the SC node 105, the DC-DC converter 106, the HDP converter controller 110, the main switch 214, and the inductor 218 of FIGS. 1 and/or 2. FIG. 3 further includes example back-to-back SR switches 300a-b, 306a-b, 312a-b, example DC-DC capacitors 302, 308, 314, and example output voltages 304, 310, 316. Although, the switches 300a-b, 306a-b, 312a-b are represented as metal-oxide-semiconductor field-effect transistors (MOSFETs), the switches 300a-b, 306a-b, 312a-b may be implemented by any type of switch.

As shown in FIG. 3, to achieve a multiple-output structure of the HDP converter 100, the DC-DC converter 106 is modified to include rectifier switches and DC-DC capacitors for each output. For example, the first output voltage 304 corresponds to the voltage across the first DC-DC capacitor 302 when the back-to-back SR switches 300a-b are enabled, the second output voltage corresponds to the voltage across the second DC-DC capacitor 308, when the back-to-back SR switches 306a-b are enabled, and the third output voltage corresponds to the voltage across the third DC-DC capacitor 314 when the back-to-back SR switches 312a-b are enabled. Accordingly, the HDP converter controller 110 can control the output voltages 304, 310, 316 independently based on the SR switch combinations (e.g., the first back-to-back switches 300a-b, the second back-to-back switches 306a-b, or the third back-to-back switches 312a-b) that are enabled. Accordingly, the HDP converter controller 110 can control the DC-DC switches to generate desired voltage outputs (e.g., where the output voltages 304, 310, 316 can be equal to the desired output or can be equal to different desired outputs).

Because the DC-DC outputs are connected to the node 318 through a switch, the SR switches may block negative currents to prevent charge equalization between the outputs. For example, if the first DC-DC output is −10 V and the second DC-DC output is −12 V and the switch corresponding to the second DC-DC output is enabled, the −10 V DC-DC output would discharge through the body diode of the second switch connecting the second output voltage to the node 318 until it reaches −12V. Accordingly, the back-to-back switches 300a-b, 306a-b, 312a-b are utilized to block positive and negative voltage and currents to control the connection of the inductor 218 to the respective loads. However, when the loads are not resistive or do not act as a current sink, the load may act as a switching device and such back-to-back switches 300a-b, 306a-b, 312a-b may not be required, as further described hereinbelow in conjunction with FIGS. 4-5.

Figure 4:
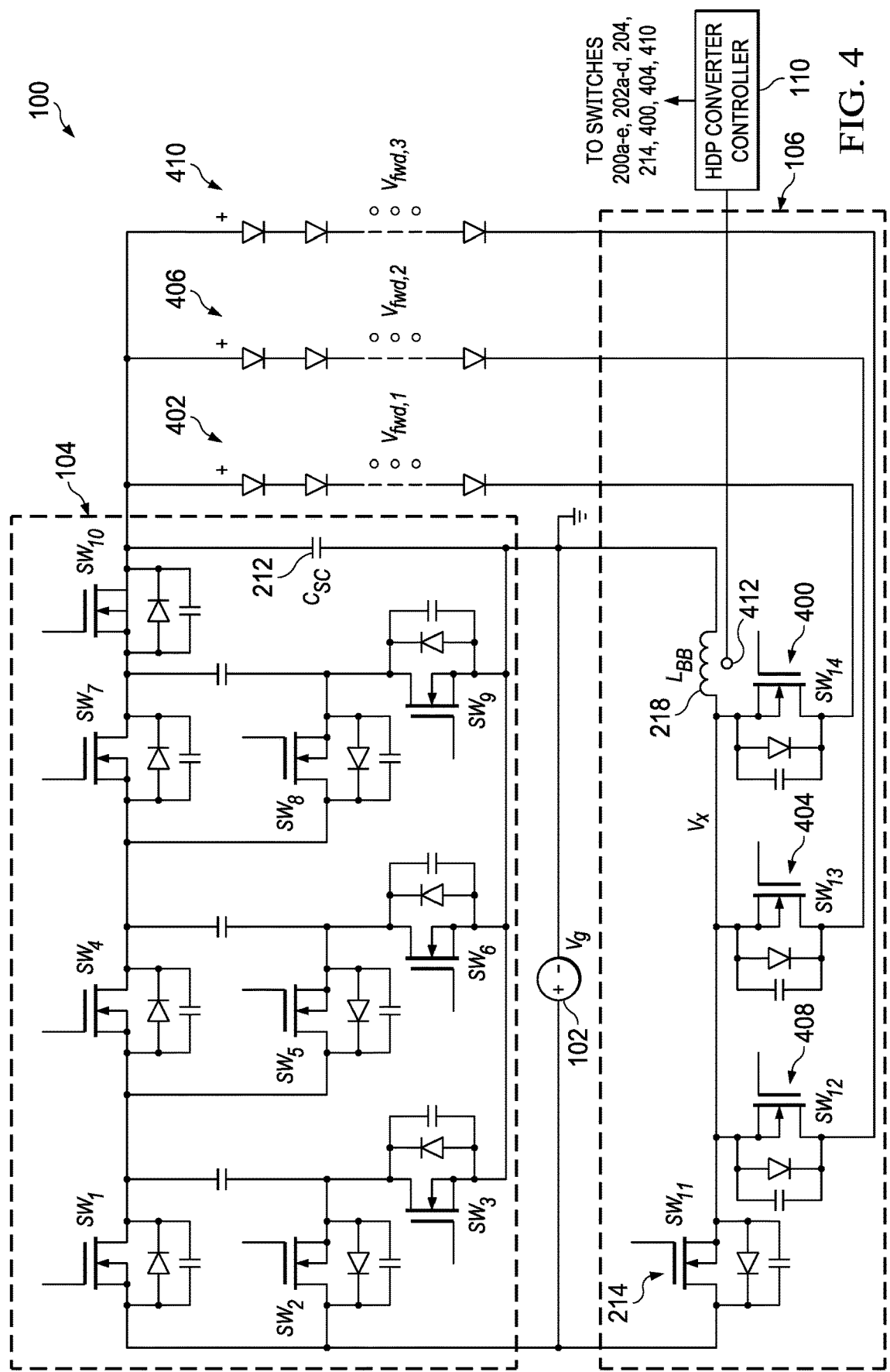
FIG. 4 is a detailed view of an example switched capacitor converter and an example DC-DC converter of a HDP converter of FIG. 1 to operate example multiple light emitting diode (LED) strings.

FIG. 4 is an example detailed view of the SC converter 104 and the DC-DC converter 106 of an HDP converter 100 of FIG. 1 to operate example multiple light emitting diode (LED) strings. FIG. 4 includes the voltage source 102, the HDP converter controller 110, the SC capacitor 212, the main switch 214 and the inductor 218 of FIGS. 1 and/or 2. FIG. 4 further includes example SR switches 400, 404, 408, and example LED strings 402, 406, 410, and an example current sensor 412. Alternatively, the LED strings 402, 406, 410 may represent any non-resistive and non-current sink load.

For LED loads (or other non-resistive/non-current sink loads), the light output (e.g., brightness, color, etc.) corresponds to the current through the LED strings 402, 406, 410 as opposed to the voltage across the LED strings 402, 406, 410. Accordingly, a constant voltage across the LED strings 402, 406, 410 is not required. Each LED string 402, 406, 410 may be connected to the inductor 218 via control of the SR switches 400, 404, 408. For example, the first LED string 402 is connected to the inductor 218 when the first SR switch 400 is enabled, the second LED string 406 is connected to the inductor 218 when the second SR switch 404 is enabled, etc. Because the LED strings 402, 406, 410 inherently ensure current flows in one direction and the DC-DC capacitor 220 has been removed, the inductor 218 of the DC-DC converter 106 is discharged by the output voltage of the SC converter 104 minus the forward voltage drop of the LED strings 402, 406, 410. Accordingly, the inductor 218 acts as a current source.

Removing the DC-DC capacitor 220 reduces the overall volume of the HDP converter 100 and effectively makes the SC output capacitor 212 the output capacitor of the DC-DC converter 106, where each string represents an alternative path to such an output (e.g., via enabling the SR witches 400, 404, 408). Also, because the LED strings 402, 406, 410 are non-resistive loads, the back-to-back switch structure of FIG. 3 may be reduced to the single SR switches 400, 404, 408 to reduce a large portion of the silicon area. Further, the HDP converter 100 of FIG. 4 will naturally operate in discontinuous conduction mode (DCM) without the calculation of a $T_{off}$ (e.g., a time corresponding to when the SR switches 400, 404, 408 need to be turned on to completely discharge the inductor 218).

During operation, the HDP converter controller 110 controls SC switches of the SC converter 104 to charge up the SC capacitor 212. Also, the HDP converter controller 110 enables the main switch 214 to charge the inductor 218. To allow current to flow through the LED strings 402, 406, 410, the HDP converter controller 110 disables the main switch 214 and enables one of the SR switches 400, 404, 408. For example, when the HDP converter controller 110 enables the first SR switch 400, the inductor 218 acts as a current source and the SC capacitor 212 discharges current through the first LED string 402. Accordingly, the HDP converter controller 110 enables the main switch 214 to charge the inductor 218 and disables the main switch 214 and enables one or more of the SR switches 400, 404, 408, while the main switch 214 is disabled, to draw current through the LED strings 402, 406, 410. In some examples, the HDP converter controller 110 only enables one SR switch 400, 404, 408 during each main switch disable cycle. In some examples, the HDP converter controller 110 toggles between the SR switches 400, 404, 408 during each main switch disable cycle.

To ensure that the currents drawn by each LED string 402, 406, 410 match (e.g., within a threshold range) the desired output current and/or to ensure that the currents drawn by each LED string 402, 406, 410 match, the HDP converter controller 110 performs a current balancing protocol based on a current measured by the current sensor 412 (e.g., which measures the output current through the inductor 218). Current mismatches between LED strings 402, 406, 410 (e.g., current errors) can arise due to variations of devices across a die. The current balancing protocol compares the current drawn by each respective LED String 402, 406, 410 and adjusts the timing of the enabling/disabling of the switches 214, 400, 404, 408 to compensate for any error (e.g., to increase or decrease the current drawn during a subsequent cycle).

Figure 5:
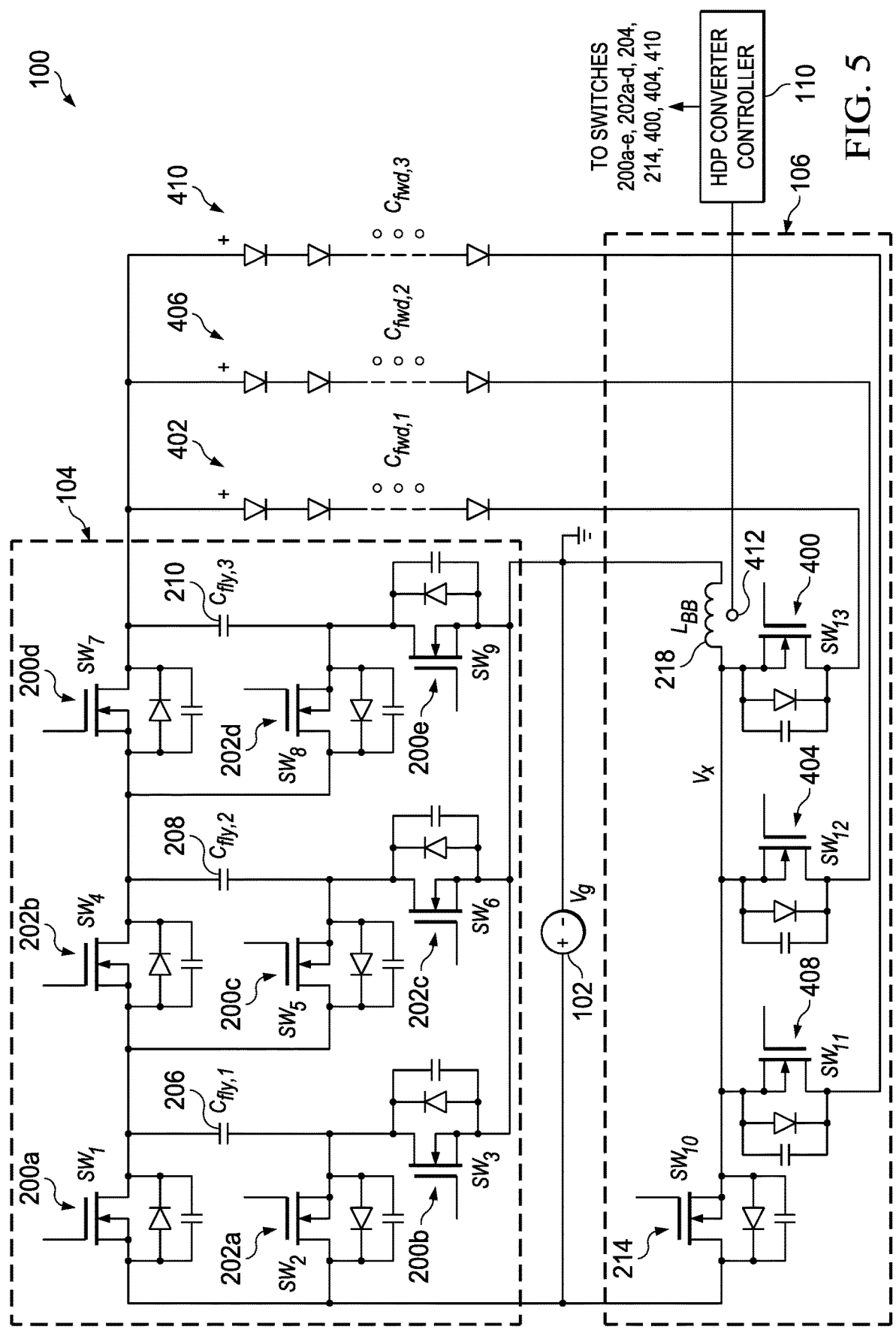
FIG. 5 is a detailed view of an alternative example switched capacitor converter and an example DC-DC converter of a HDP converter of FIG. 1 to operate example light emitting diode (LED) strings.

FIG. 5 is an example detailed view of the SC converter 104 and the DC-DC converter 106 of an HDP converter 100 of FIG. 1 to operate example multiple light emitting diode (LED) strings. FIG. 5 includes the voltage source 102, the HDP converter controller 110, the main switch 214 and the inductor 218, the SR switches 400, 404, 408, the LED strings 402, 406, 410, and the current sensor 412 of FIG. 4. Alternatively, the LED strings 402, 406, 410 may represent any non-resistive and non-current sink load.

Because the HDP converter controller 110 provides pulsating current though the LED strings 402, 406, 410 (e.g., the current being drawn from the SC converter 104 when the corresponding switch 400, 404, 408 is connected, thereby connecting the SC converter output to the inductor 218), when the LED strings 402, 406, 410 are disconnected (e.g., by disabling the switches 400, 404, 408) they are floating (e.g., have no path to ground, thereby not conducting current). Accordingly, the output of the SC capacitor 212 of FIGS. 2-4 may not be needed in some applications. Accordingly, the SC capacitor 212 and the corresponding switch (e.g., switch 202e) may be removed to further reduce the size of the HDP converter 100. However, the removal of the SC capacitor 212 makes control of the SC converter 104 dependent on control of the DC-DC converter 106. For example, the HDP converter controller 110 may control the SC switches 200a-e, 202a-e to operate the flying capacitors 206, 208 as a 2-stage Fibonacci SC to the flying capacitor 210. In such an example, the HDP converter controller 110 toggles between the complementary groups of switches 200a-e and 202a-e, while the SR switches are 400, 404, 408 are disabled, to generate an SC output voltage (e.g., across the flying capacitor 210) that is five times the voltage source 102. Once the SC capacitor 212 is charged, the HDP converter controller 110 enables (i) a third group of switches (e.g., enabling SC switches 200a, 200c, 202d while disabling the other SC switches) and (ii) one of the SR switches 400, 404, 408 to discharge the flying capacitors 210 though a respective LED string 402, 406, 410 (e.g., depending on which SR switch 400, 404, 408 is enabled). Also, the HDP converter controller 110 may perform current balancing using the current sensor 412, as explained above in conjunction with FIG. 4.

Figure 6:
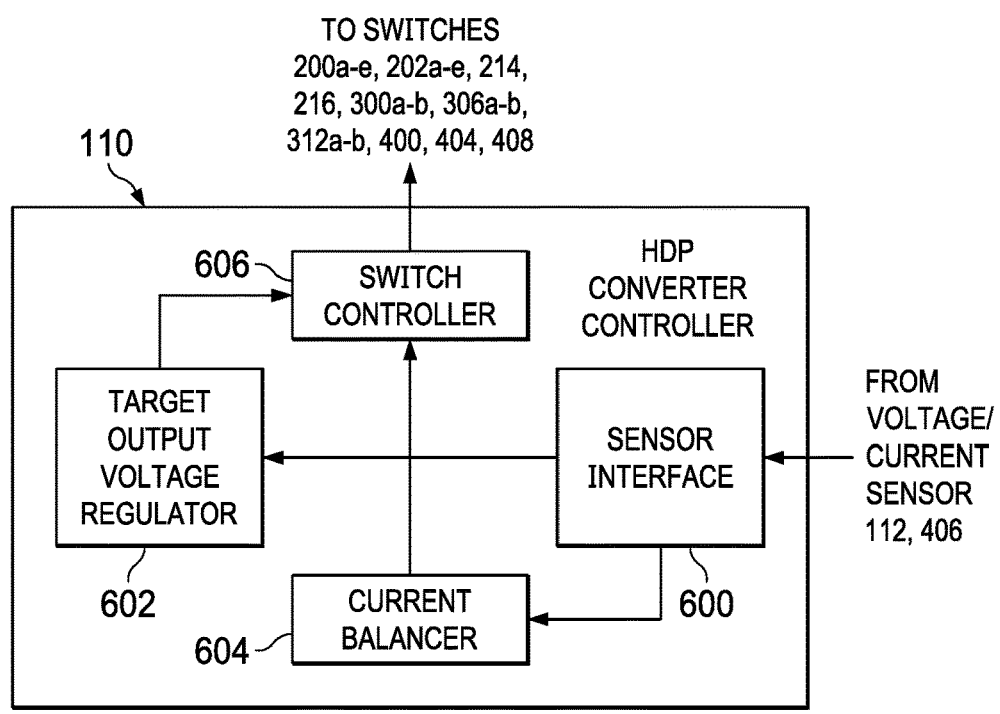
FIG. 6 is a block diagram of an example HDP converter controller of FIGS. 1-5.

FIG. 6 is a block diagram of the HDP converter controller 110 of FIGS. 1-5. FIG. 6 includes an example sensor interface 600, an example target output voltage regulator 602, an example current balancer 604, and an example switch controller 606.

The sensor interface 600 receives voltage measurements from the voltage sensor 112 of FIGS. 1-3 and/or receives current measurements from the current sensor 412 of FIGS. 4-5. The sensor interface 600 transmits the received (e.g., sensed) voltage from the voltage sensor 112 to the target output voltage regulator 602 for further processing. Additionally or alternatively, the sensor interface 600 transmits the received (e.g., sensed) current from the current sensor 412 to the current balancer 604 for further processing.

The target output voltage regulator 602 regulates the output voltage(s) 108, 304, 310, 316 based on a desired output voltage and the actual received output voltage(s) 108, 304, 310, 316 from the voltage sensor 112 by generating a switching protocol for the SC switches and/or the DC-DC switches corresponding to a desired output voltage. When the HDP converter 100 initially starts up, the target output voltage regulator 602 determines a desired output voltage of the HDP converter 100. The desired output voltage may be preset and/or may be based on an instruction from another device/processor. Because the output of the SC converter 104 may be preset (e.g., based on the structure of the SC converter 104), the target output voltage regulator 602 determines how to toggle the DC-DC switches (e.g., switches 214, 216, 300a-b, 306a-b, 312a-b of FIG. 2 or 3) to generate a DC-DC output voltage that corresponds to desired output voltage. For example, if the SC output voltage is 15 V and the desired output voltage is 18 V, the target output voltage regulator 602 determines a frequency/PWM toggling scheme for the DC-DC switches, such that the DC-DC output voltage is equal to −3 V (e.g., 15 V−(−3 V)=18 V).

Once the initial toggling scheme has been set forth, the target output voltage regulator 602 determines if the actual output voltage 108, 304, 310, 316 (e.g., from the voltage sensor 112) is within a threshold range of the desired output voltage. If the target output voltage regulator 602 determines that the actual output voltage(s) 108, 304, 310, 316 is not within a threshold range of the desired output voltage, the target output voltage regulator 602 adjusts the toggling scheme to adjust the DC-DC converter output so that the output voltage(s) 108, 304, 310, 316 better match the desired output voltage.

The current balancer 604 regulates the output current for the HDP converter 100 of FIGS. 4-5 (e.g., when the HDP converter 100 is driving a non-resistive load) by generating a switching protocol for the SC switches and/or the DC-DC switches corresponding to a desired output current. The current balancer 604 receives a sensed current from the current sensor 412 of FIGS. 4-5 (e.g., via the sensor interface 600) to determine if the current matches (e.g., is within a threshold range of) a desired current and/or to ensure that the currents of multiple outputs are the same. The current balancer 604 compares the ongoing current to a reference to identify current error (e.g., the amount of current above or below the threshold). The current balancer 604 may adjust the control of the main switch 214 based on the error. For example, the current balancer 604 may generate a switching scheme that enables the main switch 214 for a longer duration of time when the current error caused the actual sensed current to be below the desired current. An example hardware implementation of the current balancer 604 is further described hereinbelow in conjunction with FIG. 7.

The switch controller 606 transmits signals to the switches 200a-e, 200a-e, 214, 300a-b, 306a-b, 312a-b, 400, 404, 408 following the protocol defined by the target output voltage regulator 602 and/or the current balancer 604. For example, the switch controller 606 may facilitate a first switching protocol to enable and disable the SC switches (e.g., SC switches 200a-e, 202a-e) to provide a desired SC output voltage (e.g., at the SC node 105). Also, the switch controller 606 may facilitate a second switching protocol to enable and disable the DC-DC switches (e.g., DC-DC switches 214, 216, 300a-b, 306a-b, 312a-b, 400, 404, 408) to provide a desired DC output voltage(s) and/or discharge current from the SC converter 104 to ground via the DC-DC converter 106. If the target output voltage regulator 602 or the current balancer 604 adjusts the switching protocol, the switching controller 606 facilitates operation of the switches based on the adjusted protocol.

Figure 7:
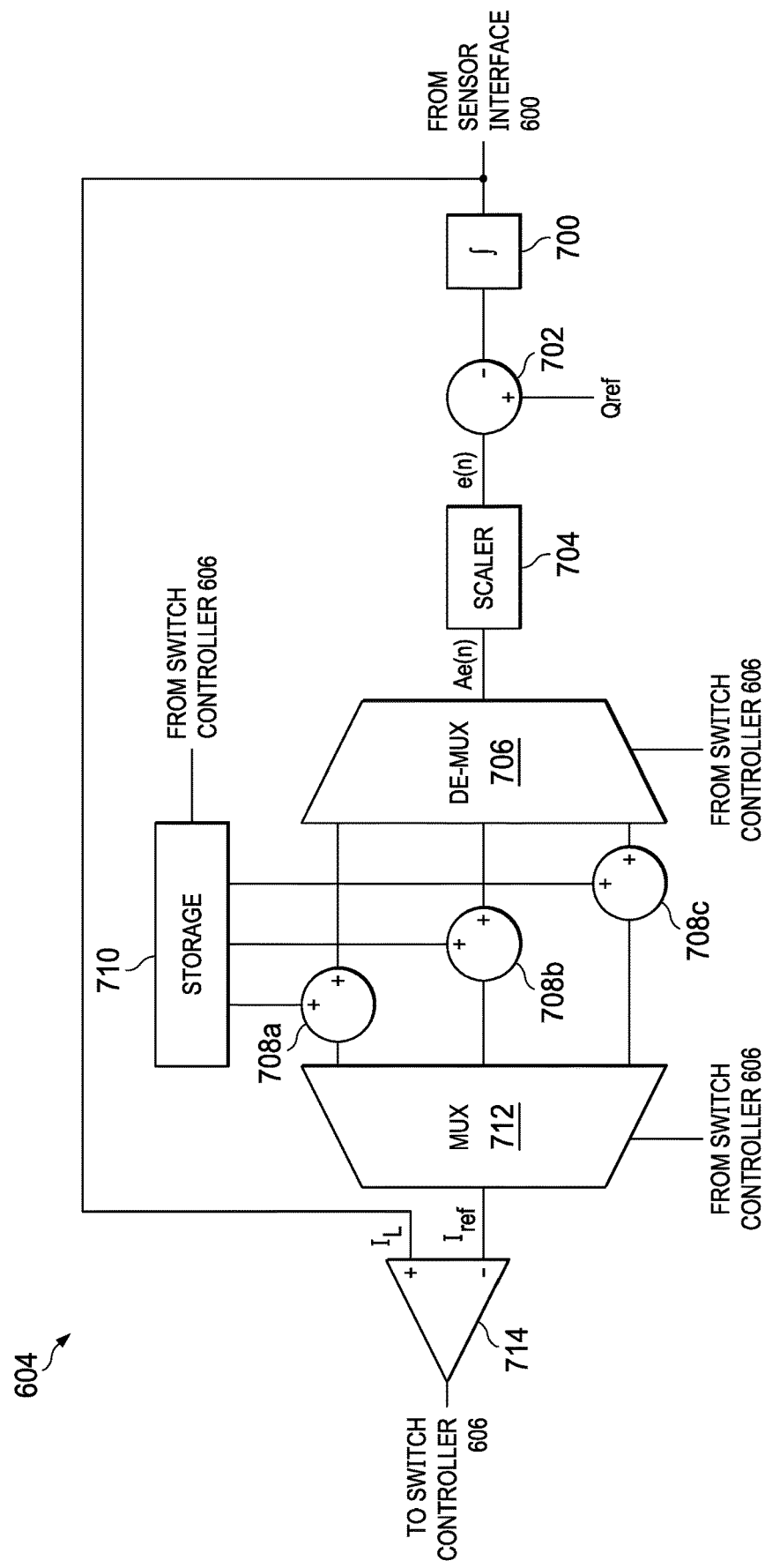
FIG. 7 is a hardware implementation of an example current balancer of FIG. 6

FIG. 7 is a block diagram of a hardware implementation of the current balancer 604 of FIG. 6. FIG. 7 includes an example integrator 700, an example summer 702, an example scaler 704, an example de-multiplexer (DE-MUX) 706, example summers 708a-c, an example storage 710, an example MUX 712, and an example comparator 714. Although, the current balancer 604 of FIG. 7 is described in conjunction with a three-output HDP converter, the current balancer 604 may be correspond to an HDP converter with any number of outputs (e.g., by adjusting the number of summers 708a-c and the number of DE-MUX outputs/MUX inputs to correspond to the number of HDP converter outputs).

The integrator 700 integrates the sensed current ($i_L(t)$) from the current sensor 412 (e.g., via the sensor interface 600) during a discharging time (e.g., while the inductor 218 is sending current through one of the LED strings 402, 406, 410). In this manner, if the charges corresponding to each HDP output are equal, then the currents through the LED strings 402, 406, 410 are equal. The integrator 700 is reset after each comparison (e.g., after the output of the comparator 714 goes high). Once the sensed current is integrated to determine the sensed charge ($\int i_L(t)dt$), the summer 702 generates an error (a current/charge error, e(n), where n represents the LED string) by removing a reference charge (e.g., corresponding to a desired output current) from the integrated current (e(n)=$\int i_L(t)dt-Q_{ref}$). In this manner, if the integrated current (e.g., corresponding to the sensed charge) is the same as the reference charge, then there is no error (e.g., the sensed current is equal to the desired current).

The scaler 704 scales the error by the integral gain (A) of the current balancer 604 (e.g., Ae(n)). The scaled error is transmitting to the input of the DE-MUX 706. The DE-MUX 706 transmits the scaled error to one of the summers 708a-c based on which LED string 402, 406, 410 is currently being discharged (e.g., corresponding to the sensed current). The switch controller 606 transmits signal to the select input based on which SR switch (e.g., of the SR switches 400, 404, 408) is currently enabled (e.g., corresponding to which LED string 402, 406, 410 is being discharged). For example, if the first LED string 402 is being discharged, the switch controller 606 sends a signal to the select of the DE-MUX 706 to transmit the scaled error to the first summer 708a.

The storage 710 stores previously sensed currents/previous current references corresponding to each LED string 402, 406, 410. For example, initially, the storage 710 stores a reference current for each of the LED strings 402, 406, 410 and stores them for subsequent error corrections. The initial reference current may be based on a input from a user or other device (e.g., corresponding to a desired brightness of the LED strings 402, 406, 410). Once the initial reference current is stored, subsequent reference currents may be stored based on sensed current through the LED strings 402, 406, 410. The storage 710 provides the reference representative of an initial value and/or previous currents through each of the LED strings 402, 406, 410 to the respective summers 708a, 708b, 708c. For example, the storage 710 provides (A) the previous current reference for the first LED string 402 to the first summer 708a, (B) the previous current reference for the second LED string 406 to the second summer 708b, and (C) the previous current reference for the third LED string 410 to the third summer 708c.

The summers 708a-c generate a new reference current by adding the scaled error corresponding to the ongoing current to the previous current for each respective LED string (e.g., $I_{ref,n}(t+1)=I_{ref,n}(t)+Ae(n)$ or $I_{ref,n}(t+1)=I_{ref,n}(t)+A(\int i_L(t)dt-Q_{ref})$, where $I_{ref,n}(t+1)$ is the reference current of the LED string n for the ongoing cycle and $I_{ref,n}(t)$ is the reference current for the previous cycle). The storage 710 replaces the old reference current with the new reference current for subsequent comparisons. The new reference currents are transmitted to the MUX 712.

The MUX 712 outputs the ongoing reference current corresponding to the LED string 402, 406, 410 that is currently discharging current (e.g., via a control signal from the switch controller 606) to a first input of the comparator 714. The sensed ongoing current (e.g., via the current sensor 412) is transmitted to a second input of the comparator. In this manner, when the ongoing reference current increases to a level above the sensed ongoing current, the comparator outputs a logic value (e.g., a high logic value or '1') to the switch controller 606. The duration of time it takes to output the high value corresponds the duration of time that the switch controller 606 needs to enable/disable the DC-DC switches 214, 400, 404, 408 so that subsequent current discharged through the respective LED strings 402, 406, 410 better matches the desired output current. In this manner, a current reading from each cycle can be used to reduce the current error in a subsequent cycle until the error is eliminated or below a threshold range of error.

FIGS. 6-7 shows an example implementation of the HDP converter controller 110 of FIGS. 1-5. Further, the sensor interface 600, the target output voltage regulator 602, the current balancer 604, the switch controller 606, the integrator 700, the summer 702, the scaler 704, the DE-MUX 706, the summers 708a-c, the storage 710, the MUX 712, the comparator 714, and/or, more generally, the HDP converter controller 110 of FIGS. 6-7 may be implemented by hardware, software, firmware and/or any combination of hardware, software and/or firmware. For example, any of the sensor interface 600, the target output voltage regulator 602, the current balancer 604, the switch controller 606, the integrator 700, the summer 702, the scaler 704, the DE-MUX 706, the summers 708a-c, the storage 710, the MUX 712, the comparator 714, and/or, more generally, the HDP converter controller 110 of FIGS. 6-7 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). In an example software and/or firmware implementation, at least one of the sensor interface 600, the target output voltage regulator 602, the current balancer 604, the switch controller 606, the integrator 700, the summer 702, the scaler 704, the DE-MUX 706, the summers 708a-c, the storage 710, the MUX 712, the comparator 714, and/or, more generally, the HDP converter controller 110 of FIGS. 6-7 include(s) a computer-readable medium (such as a hard drive, a memory, a digital versatile disc (DVD), a compact disc (CD), a Blu-ray disk, etc. including the software and/or firmware. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 8:
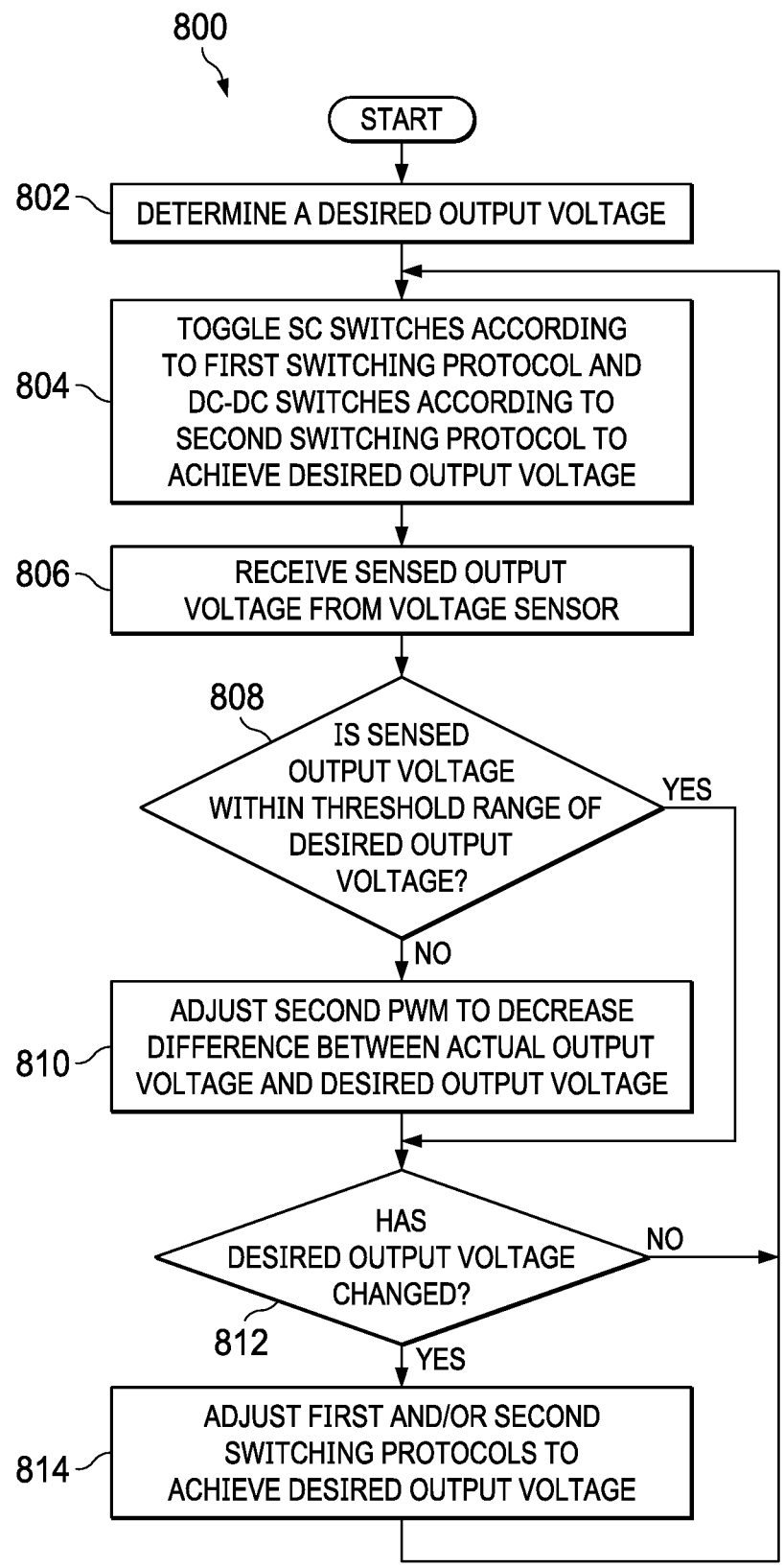
FIG. 8 is a flowchart representative of machine readable instructions that are executable to implement the HDP converter controller of FIGS. 1-6 to regulate output voltage.
Figure 9:
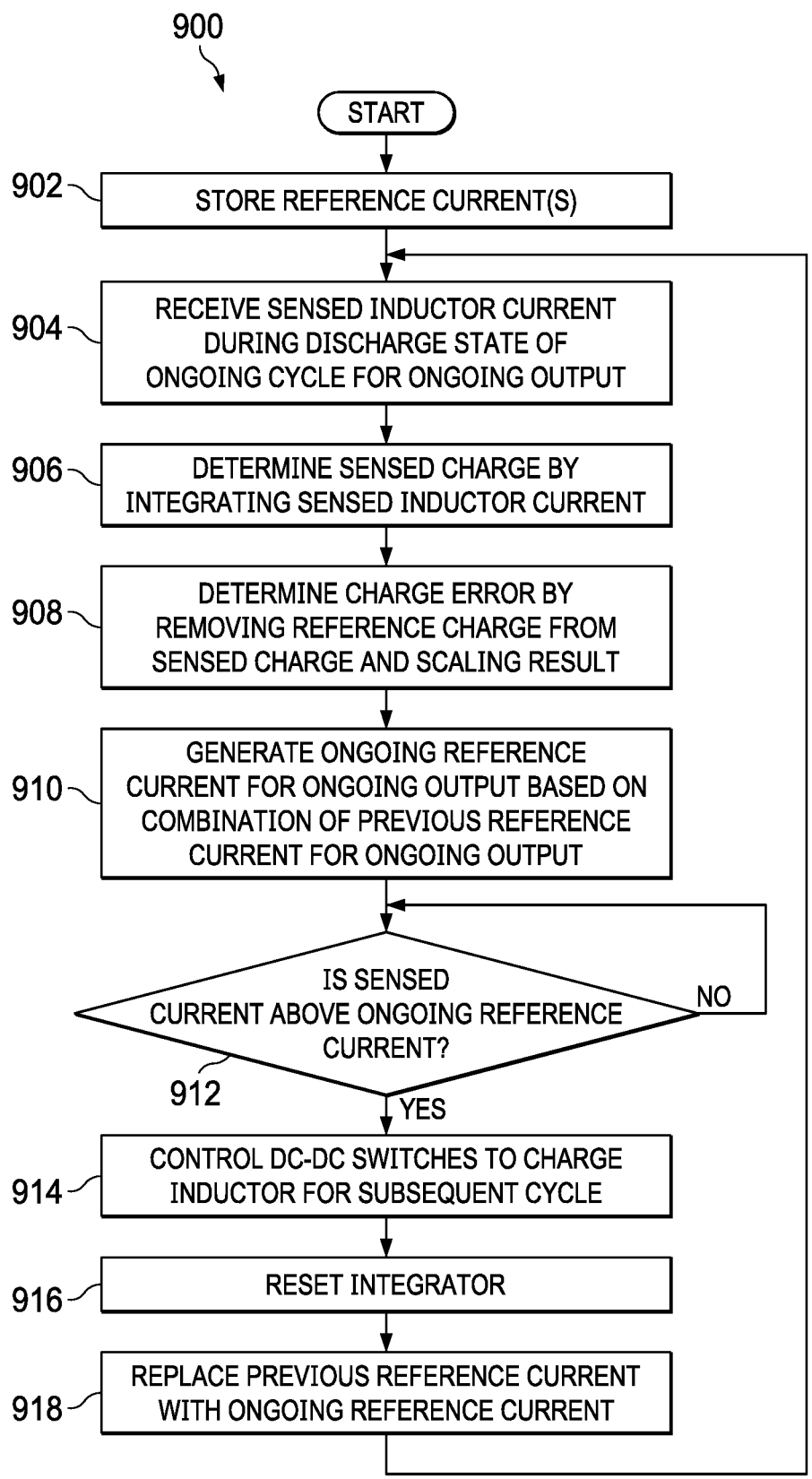
FIG. 9 is a flowchart representative of machine readable instructions that are executable to implement the HDP converter controller of FIGS. 1-7 to regulate output current.

Flowcharts representative of example hardware logic or machine readable instructions for implementing the HDP converter controller 110 of FIGS. 6-7 are shown in FIGS. 8-9. The machine readable instructions may be a program or portion of a program for execution by a processor such as the processor 1012 shown in the processor platform 1000 discussed hereinbelow in connection with FIG. 10 for causing the apparatus to perform the methods and processes described herein. The program may be embodied in software stored on a computer-readable medium, but the entire program and/or parts thereof could alternatively be executed by a device other than the processor 1012 and/or embedded in firmware or dedicated hardware. Further, although the example program is described with reference to the flowcharts of FIGS. 8-9, other methods of implementing the HDP converter controller 110 may alternatively be used. For example, the order of execution of the blocks may be changed, and/or some of the blocks described may be changed, eliminated, or combined. Additionally or alternatively, any or all of the blocks may be implemented by one or more hardware circuits (such as discrete and/or integrated analog and/or digital circuitry, a field programmable gate array (FPGA), an application specific integrated circuit (ASIC), a comparator, an operational-amplifier (op-amp), a logic circuit, etc.) structured to perform the corresponding operation without executing software or firmware.

As described hereinabove, the processes of FIGS. 8-9 may be implemented by executable instructions (e.g., computer and/or machine readable instructions) computer-readable medium.

FIG. 8 is an example flowchart 800 representative of example machine readable instructions that may be executed by the HDP converter controller 110 of FIGS. 6-7 to ensure that an output voltage matches (e.g., is within a threshold range of) the desired output voltage. Although the instructions of FIG. 8 are described in conjunction with the HDP converter 100 of FIG. 2, the instructions may be used by any type of HDP converter with any number of outputs.

At block 802, the target output voltage regulator 602 determines a desired output voltage. The desired output voltage may be preset and/or may be based on instructions from another device/processor. At block 804, the switch controller 606 toggles the SC switches 200a-e, 202a-e according to a first switching protocol and the DC-DC switches 214, 216 according to a second switching protocol to achieve a desired output voltage. The first switching protocol determines which group of complementary switches to enable/disable together to achieve the desired SC output voltage at the SC output node 105. The second switching protocol determines how to enable/disable the DC-DC switches 214, 216 (e.g., based on frequency, PWM, etc.) to achieve the desired DC-DC output voltage at the DC-DC output node 107 that corresponds to the desired output voltage (e.g., the output voltage 108=SC output voltage−the DC-DC output voltage). In some examples, the first and second protocols are independent of each other. In some examples, the first and second protocols are dependent on each other (e.g., to ensure a proper discharge, as described hereinabove in conjunction with FIG. 5).

At block 806, the sensor interface 600 receives a sensed output voltage from the voltage sensor 112. The voltage sensor 112 senses (e.g., measures) the actual output voltage 108 of the HDP converter 100. At block 808, the target output voltage regulator 602 determines if the sensed output voltage 108 is within a threshold range (e.g., based on a user, protocol, and/or manufacturer preference) of the desired output voltage. If the target output voltage regulator 602 determines that the sensed output voltage 108 is within the range of the desired voltage output (block 808: YES), the process continues to block 812. If the target output voltage regulator 602 determines that the sensed output voltage 108 is not within the range of the desired voltage output (block 808: NO), the target output voltage regulator 602 instructs the switch controller 606 to adjust the second protocol to decrease the difference between the actual output voltage 108 and the desired output voltage (block 810). For example, if the actual output voltage 108 is 25 V, the desired output voltage is 24 V, and the SC voltage is 18 V (e.g., the current DC-DC output voltage is −7V), the target output voltage regulator 602 adjusts the second protocol to change the DC-DC output from −7 V to −6 V and transmits the adjusted second protocol to the switch controller 606 for implementation.

At block 812, the target output voltage regulator 602 determines if the desired output voltage has changed. For example, a device/processor may transmit instructions to adjust the output voltage 108 to a different output voltage. If the target output voltage regulator 602 determines that the desired output voltage has not changed (block 812: NO), the process returns to block 804. If the target output voltage regulator 602 determines that the desired output voltage has changed (block 812: YES), the target output voltage regulator 602 adjusts the first and/or second switching protocols to achieve the desired output voltage (block 814) and the process returns to block 804.

FIG. 9 is an example flowchart 900 representative of example machine readable instructions that may be executed by the HDP converter controller 110 of FIGS. 1-7 to ensure that an output current matches (e.g., is within a threshold range of) the desired output current. Although the instructions of FIG. 9 are described in conjunction with the HDP converter 100 of FIGS. 4 and/or 5, the instructions may be used by any type of HDP converter with any number of outputs.

At block 902, the storage 710 of the current balancer 604 stores a reference current corresponding to a desired output current. The reference current may be based on a user and/or manufacture preference corresponding to a brightness of the LED strings 402, 406, 410. At block 904, the sensor interface 600 receives a sensed inductor current during a discharge state of an ongoing cycle for the ongoing output. For example, the sensor interface 600 may receive a sensed current from the inductor sensor 412 while one of the first, second, or third LED strings 402, 406, 410 is being discharged through the inductor 218 (e.g., based on one of the respective SR switches 400, 404, 408 being enabled).

At block 906, the integrator 700 of the current balancer 604 determines a sensed charge by integrating the sensed inductor current. At block 908, the summer 702 of the current balancer 604 determines a charge error by removing a reference charge from the sensed charge and the scaler 704 of the current balancer 604 scales the result. At block 910, one of the summers 708a, 708b, 708c generates an ongoing reference current for the ongoing output (e.g., the currently discharging LED string 402, 406, 410) based on one or more signals transmitted to a select line of the DE-MUX 706 from the switch controller 606. The one or more signals correspond to which LED string 402, 406, 410 is currently being discharged.

At block 912, the comparator 714 of the current balancer 604 determines if the sensed current is above the ongoing reference current. As described hereinabove in conjunction with FIG. 7, the amount of time before the comparator 714 outputs a high voltage corresponding to the amount of current that will be discharged. Accordingly, the current balancer 604 regulates the current based on the amount of time it takes for the ongoing current to reach the ongoing reference current (e.g., when $I_{L,n}(t) \geq I_{ref,n}(t) + A \cdot (\int i_L(t)dt - Q_{ref})$). If the comparator 714 determines that the sensed current is not above the ongoing reference current (block 912: NO), the process returns to block 912 until the sensed current is above the ongoing reference current.

If the comparator 714 determines that the sensed current is above the ongoing reference current (block 912: YES), the comparator 714 instructs the switch controller 606 to control the DC-DC switches 214, 400, 404, 408 to charge the inductor 218 for a subsequent cycle (block 914). At block 916, the integrator 700 of the current balancer 604 resets. In some examples, the output of the comparator 714 is used as a trigger to reset the integrator 700. At block 918, the storage 710 replaces the previous reference current with the ongoing reference current for a subsequent cycle.

Figure 10:
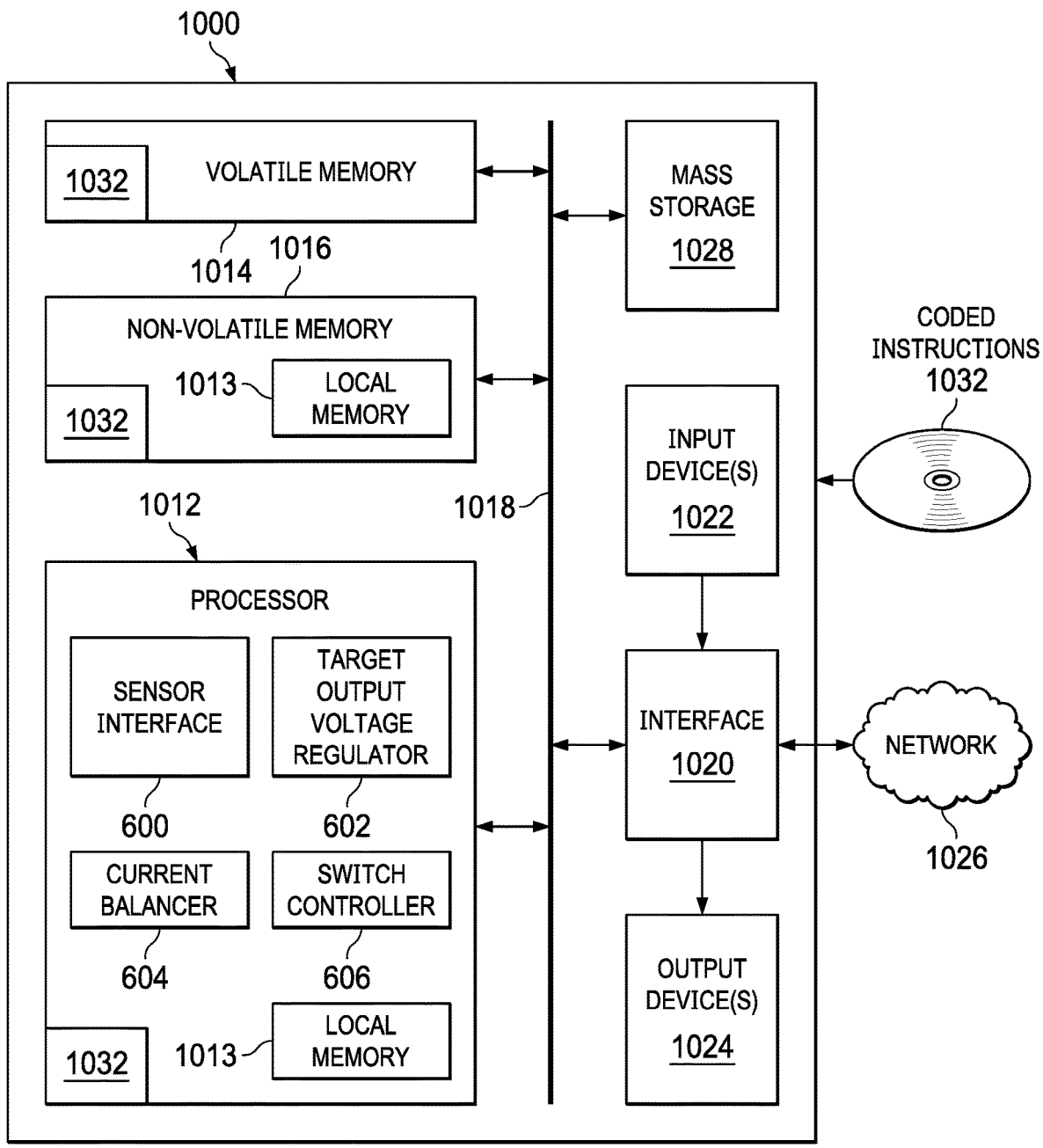
FIG. 10 is a block diagram of a processing platform to execute the instructions of FIGS. 8 and 9 to implement the HDP converter controller of FIGS. 1-7.

FIG. 10 is a block diagram of an example processor platform 1000 structured to execute the instructions of FIGS. 8-9 to implement the HDP converter controller 110 of FIGS. 6 and 7. For example, the processor platform 1000 can be a self-learning machine (e.g., a neural network), an Internet appliance, controller, a processor, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the sensor interface 600, the target output voltage regulator 602, the current balancer 604, the switch controller 606, the integrator 700, the summer 702, the scaler 704, the DE-MUX 706, the summers 708a-c, the storage 710, the MUX 712, and/or the comparator 714, In this example, the processor 1012 includes a local memory 1013 (e.g., a cache). Also, in this example, the processor 1012 communicates with a main memory including a volatile memory 1014 and a non-volatile memory 1016 via a bus 1018. The volatile memory 1014 may be implemented by synchronous dynamic random access memory (SDRAM), dynamic random access memory (DRAM), RAMBUS® dynamic random access memory (RDRAM®) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), a Bluetooth® interface, a near field communication (NFC) interface, and/or a PCI express interface.

In the illustrated example, one or more input devices 1022 are connected to the interface circuit 1020. The input device(s) 1022 permit(s) a user to enter data and/or commands into the processor 1012. For example, the input device(s) can be implemented by a camera (still or video), a keyboard, a button, a mouse, a touchscreen, a track-pad, a trackball, and/or isopoint.

One or more output devices 1024 are also connected to the interface circuit 1020 of the illustrated example. For example, the output devices 1024 can be implemented by display devices (such as a light emitting diode (LED), an organic light emitting diode (OLED), a liquid crystal display (LCD), a cathode ray tube display (CRT), an in-place switching (IPS) display, a touchscreen, etc.), a tactile output device, and/or speaker. Accordingly, the interface circuit 1020 of the illustrated example usually includes a graphics driver card, a graphics driver chip and/or a graphics driver processor.

The interface circuit 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1026. For example, the communication can be via an Ethernet connection, a digital subscriber line (DSL) connection, a telephone line connection, a coaxial cable system, a satellite system, a line-of-site wireless system, a cellular telephone system, etc.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, redundant array of independent disks (RAID) systems, and digital versatile disk (DVD) drives.

The machine executable instructions 1032 of FIGS. 8-9 may be stored in the mass storage device 1028, the volatile memory 1014, the non-volatile memory 1016, and/or another computer-readable medium.

A computer program product is an article of manufacture that has: (a) a computer readable medium; and (b) a computer readable program that is stored on such medium. Such program is processable (e.g., executable) by an instruction execution apparatus for causing the apparatus to perform its operations described hereinabove. For example, in response to processing (e.g., executing) such program's instructions, the apparatus performs its operations described hereinabove, so that such operations are at least partially computer implemented.

Such program (e.g., software, firmware, and/or microcode) is written in one or more programming languages, such as: an object-oriented programming language (e.g., C++); a procedural programming language (e.g., C); and/or any suitable combination thereof. In a first example, the computer-readable medium is a computer readable storage medium. In a second example, the computer-readable medium is a computer-readable signal medium.

A computer-readable storage medium includes any system, device and/or other non transitory tangible apparatus (e.g., electronic, magnetic, optical, electromagnetic, infrared, semiconductor, and/or any suitable combination thereof) that is suitable for storing a program, so that such program is processable by an instruction execution apparatus for causing the apparatus to perform its operations described hereinabove. Examples of a computer-readable storage medium include: an electrical connection having one or more wires; a portable computer diskette; a hard disk; a random access memory ("RAM"); a read-only memory ("ROM"); an erasable programmable read-only memory ("EPROM" or flash memory); an optical fiber; a portable compact disc read-only memory ("CD ROM"); an optical storage device; a magnetic storage device; and/or any suitable combination thereof.

A computer-readable signal medium includes any computer-readable medium (other than a computer-readable storage medium) that is suitable for communicating (e.g., propagating or transmitting) a program, so that such program is processable by an instruction execution apparatus for causing the apparatus to perform its operations described hereinabove. In one example, a computer-readable signal medium includes a data signal having computer-readable program code embodied therein (e.g., in baseband or as part of a carrier wave), which is communicated (e.g., electronically, electromagnetically, and/or optically) via wireline, wireless, optical fiber cable, and/or any suitable combination thereof.

From the foregoing, it will be appreciated that example methods, apparatus and articles of manufacture have been disclosed that provide a high efficiency hybrid power converter and methods to control the same. Examples disclosed herein include a hybrid power converter that leverages the efficiency of an SC converter with the controllability of a DC-DC converter, thereby increasing power converter efficiency while reducing the size of an inductor of the DC-DC converter needed to operate. Accordingly, examples disclosed herein provide a power converter that has up to a 70% reduction of passive volume compared to conventional converters while increasing the efficiency up to 20% to avoid problems associated with heat density. Additionally, examples disclosed herein include performing current matching for non-resistive loads (such as LED loads) that matches current between multiple outputs within 2% over the operating range.

Modifications are possible in the described embodiments, and other embodiments are possible, within the scope of the claims.

What is claimed is:

1. An apparatus comprising:
a switched capacitor (SC) converter having a first group of switches, a first input and a first output, the first input adapted to be coupled to a voltage source, the first group of switches having first control inputs configured to control states of the first group of switches responsive to first control signals at the first control inputs, and the SC converter configured to generate a first voltage at the first output based on: a voltage at the voltage source; and the states of the first group of switches;
a direct current-to-direct current (DC-DC) converter having a second group of switches, a second input and a second output, the second input adapted to be coupled to the voltage source, the second group of switches having second control inputs configured to control states of the second group of switches responsive to second control signals at the second control inputs, and the DC-DC converter configured to generate a second voltage at the second output based on: the voltage at the voltage source; and the states of the second group of switches;
a voltage sensor having a sensor output and first and second sensor inputs, the first sensor input coupled to the first output, the second sensor input coupled to the second output, and the voltage sensor configured to generate an output voltage at the sensor output responsive to a difference between the first voltage and the second voltage; and
a converter controller having a controller input, first controller outputs and second controller outputs, the controller input coupled to the sensor output, the first controller outputs coupled to the first control inputs, the second controller outputs coupled to the second control inputs, and the converter controller configured to: based on a targeted output voltage, generate the first control signals at the first controller outputs, and generate the second control signals at the second controller outputs; and adjust the second control signals at the second controller outputs responsive to the output voltage being outside a threshold range of the targeted output voltage.

2. The apparatus of claim 1, wherein the DC-DC converter is an inverting DC-DC converter, and the second voltage is a negative voltage.

3. The apparatus of claim 1, wherein the DC-DC converter is a buck converter, a boost converter, or a buck-boost converter.

4. The apparatus of claim 1, wherein the DC-DC converter has a third output and is configured to generate the second voltage at the third output, and the voltage sensor is configured to generate the output voltage at the sensor output responsive to a difference between at least one of: the first output and the second output; or the first output and the third output.

5. The apparatus of claim 1, wherein the DC-DC converter includes back-to-back synchronous rectifier switches.

6. The apparatus of claim 1, wherein the converter controller is configured to adjust the second control signals at the second controller outputs by adjusting at least one of (A) a frequency of switching the second control signals or (B) a pulse width modulation scheme of switching the second control signals.

7. The apparatus of claim 1, wherein the sensor output is a first sensor output, the apparatus further comprises a current sensor having a second sensor output, the current sensor is configured to generate a current at the second sensor output corresponding to the output voltage, and the converter controller is configured to adjust the second control signals at the second controller outputs responsive to the current being outside a threshold range of a targeted output current.

* * * * *